(12) United States Patent
Murray

(10) Patent No.: US 10,098,314 B2
(45) Date of Patent: Oct. 16, 2018

(54) SELF-CONTAINED VEHICLE CAGE AND PET STAIRS APPARATUS

(71) Applicant: Alan Murray, Brookings, OR (US)

(72) Inventor: Alan Murray, Brookings, OR (US)

(*) Notice: Subject to any disclaimer, the term of this patent is extended or adjusted under 35 U.S.C. 154(b) by 0 days.

(21) Appl. No.: 15/433,733

(22) Filed: Feb. 15, 2017

(65) Prior Publication Data

US 2018/0228118 A1 Aug. 16, 2018

(51) Int. Cl.
*A01K 1/02* (2006.01)
*A01K 1/00* (2006.01)
*B60R 3/02* (2006.01)
*A01K 29/00* (2006.01)
*A47B 88/40* (2017.01)
*A47B 81/00* (2006.01)

(52) U.S. Cl.
CPC .......... *A01K 1/0035* (2013.01); *A01K 1/0272* (2013.01); *A01K 29/00* (2013.01); *A47B 81/00* (2013.01); *A47B 88/40* (2017.01); *B60R 3/02* (2013.01)

(58) Field of Classification Search
CPC .. A01K 1/0035; A01K 1/0236; A01K 1/0245; A01K 1/0254; A01K 1/0272; A01K 1/0281; A01K 1/02; A01K 1/033; A01K 1/034
See application file for complete search history.

(56) References Cited

U.S. PATENT DOCUMENTS

| | | |
|---|---|---|
| 2,897,781 A | 8/1959 | Olson |
| 3,756,622 A | 9/1973 | Pyle et al. |
| 3,763,827 A | 10/1973 | Burkart |
| 3,797,461 A | 3/1974 | Breeden |
| 4,546,728 A | 10/1985 | May |
| 4,566,404 A | 1/1986 | Instone et al. |
| 4,724,925 A * | 2/1988 | Ritten ............ B63B 27/14 114/362 |
| 4,803,951 A | 2/1989 | Davis |
| 4,846,304 A * | 7/1989 | Rasmussen ............ A47B 77/10 182/129 |
| 4,906,038 A | 3/1990 | Morris |
| 5,154,125 A | 10/1992 | Renner et al. |
| 5,205,603 A * | 4/1993 | Burdette, Jr. ............ B60R 3/02 182/195 |
| 5,228,707 A | 7/1993 | Yoder |
| 5,599,188 A | 2/1997 | Melendez |
| 6,267,082 B1 | 7/2001 | Naragon et al. |
| 6,715,177 B1 | 4/2004 | Lagergren-Julander et al. |
| 6,983,496 B1 * | 1/2006 | Hernandez ............ A47D 15/008 5/100 |
| 7,083,219 B1 * | 8/2006 | Gregory ............ B60P 3/14 296/100.12 |
| 7,185,381 B1 | 3/2007 | Heartsill et al. |
| 7,302,725 B2 * | 12/2007 | Thygesen ............ B60P 1/43 14/69.5 |

(Continued)

FOREIGN PATENT DOCUMENTS

| | | |
|---|---|---|
| FR | 2826617 A3 | 1/2003 |
| FR | 2842773 A1 | 1/2004 |

(Continued)

*Primary Examiner* — Thanh Pham

(74) *Attorney, Agent, or Firm* — Fulwider Patton LLP

(57) ABSTRACT

A horizontal frame to mount in the back bay of a vehicle, formed with a rearwardly opening tunnel and ladder device received in the tunnel.

14 Claims, 10 Drawing Sheets

(56) References Cited

U.S. PATENT DOCUMENTS

| | | | |
|---|---|---|---|
| 7,488,025 B1 * | 2/2009 | Roberson | B60P 1/433 296/61 |
| 7,549,692 B2 * | 6/2009 | Washington | B60P 1/435 296/61 |
| 7,913,651 B1 | 3/2011 | Schiebout | |
| 8,091,294 B2 * | 1/2012 | Whalen | A01K 1/035 52/182 |
| 8,246,063 B1 | 8/2012 | Rowland et al. | |
| 8,312,846 B1 * | 11/2012 | Murray | B65G 19/00 119/847 |
| 8,899,188 B1 | 12/2014 | Douglas et al. | |
| 9,073,475 B2 * | 7/2015 | Chastain, Jr. | B60P 1/435 |
| 9,380,760 B2 | 7/2016 | Rorke et al. | |
| 2003/0007854 A1 | 1/2003 | Bonsall | |
| 2005/0166862 A1 | 8/2005 | Sanford et al. | |
| 2007/0158968 A1 * | 7/2007 | Chandler | B60P 3/14 296/37.6 |
| 2008/0042464 A1 | 2/2008 | Hutchins, Jr. et al. | |
| 2008/0122238 A1 | 5/2008 | Fulmer | |
| 2008/0173627 A1 | 7/2008 | Martin et al. | |
| 2009/0038558 A1 | 2/2009 | Schulte | |
| 2009/0044758 A1 | 2/2009 | Adams et al. | |
| 2014/0119863 A1 | 5/2014 | Hill et al. | |
| 2014/0239609 A1 | 8/2014 | Robertson | |
| 2015/0013614 A1 | 1/2015 | Salzmann | |
| 2015/0232052 A1 * | 8/2015 | Link | B60R 21/026 296/24.31 |
| 2015/0264888 A1 * | 9/2015 | Jones | A01K 1/034 119/480 |

FOREIGN PATENT DOCUMENTS

| | | | |
|---|---|---|---|
| GB | 747815 A | 4/1956 | |
| GB | 1369916 A | 10/1974 | |

\* cited by examiner

SELF-CONTAINED VEHICLE CAGE AND PET STAIRS APPARATUS

FIELD OF THE INVENTION

The invention relates to pet cages for housing pets while traveling in vehicles.

BACKGROUND OF THE INVENTION

In the United States alone there are some 46 million households with pets, and of those, 65% are larger breed dogs. The overall market for pets is $50 billion per year, and about 50% of that is dog owners. Pet owners and pets alike prefer each others' companionship, even when traveling by vehicle.

Pets, particularly dogs, are always ready for a ride in an SUV, crossover or other vehicle having some degree of interior space.

The rear door of a SUV or a crossover typically opens to an elevated floor, thus requiring the pet to leap up or be lifter up onto the floor of the rear bay. This serves well for younger dogs but as they grow older and joints deteriorate, the leap is highly challenging or totally impossible. Furthermore, in this arrangement the pet occupies practically the entire length and width of the bay, thus leaving no space available for other utility, such as storage of groceries, sporting goods, hunting equipment and dog paraphernalia.

Even then, the dog requires restraint, thus leading to the owners utilizing wire or rope barriers or the like partitioning the front and rear of the vehicle. This still leaves the rear of the vehicle totally dedicated to the pet, without space for other cargo.

The problem with loading dogs and particularly larger dogs into the vehicle often involves the purchase of a generic ladder or the like, which might be foldable or collapsible to be stored in the back seat and deployed at the loading spot. To make the load, the driver removes the ladder from the back seat and unfolds the sections to lean the top end against the bumper or rear of the vehicle to hopefully allow the dog to climb up the ladder without falling to the right or left or destabilizing the ladder. The problem is exacerbated in foul weather, when the ladder ramp may be exposed to the elements and the bottom end submerged in mud or water, often resulting in unequal loading and risk and fright to the animal as he or she seeks to climb the ramp.

It has long been known that there is a critical need for lift and ramp devices for older dogs. There are several reasons why this need has grown over the years.

First, older pets are not viewed as expendable, and owners of those with mobility limitations often seek various devices to maximize the quality and length of life for both the animal and owner, such as detachable wheels that may be strapped to the animal to provide mechanical means of independent movement or lightweight portable lift devices, such as hoists and the like. One significant challenge is that animals often tend to resist, particularly in inclement conditions, walking up a ramp where their paws might slip or be unstable. They may have a tendency to pull away from the owner or leave the ramp partway up, thus leading to injury and challenges for reorganizing the animal and getting them back on board.

These issues have been addressed in the past, including the proposal of a deployable ramp with opaque sidewalls to confine the animal ascending the ramp to avoid a sense of elevation which might disturb some animals. A device of this type is shown in U.S. Pat. No. 8,899,188 to Douglas. Such devices, while helpful for distracting animals from fear of height, are cumbersome and inconvenient to use, requiring some degree of skill and strength to store and deploy.

Other efforts have led to the proposal that a ramp that can be hinged to the rear of a vehicle and articulated so that it can be folded out for access by the animal A device of this type is shown in U.S. Pat. No. 6,715,177 to Lagergren-Julander. Such devices again suffer the shortcoming that they must be folded up and stored in the back seat or back bay of the vehicle and must be pulled out and unfolded each time of use to be somehow releasably attached to the vehicle itself.

It is also recognized that there can be benefits to containing the pet within the confines of an enclosure to be installed in a vehicle. That is, it has been proposed to provide a collapsible framework with mesh or the like to thus provide a separate housing with the vehicle. A device of this type is shown to U.S. Pat. No. 4,803,951 to Davis. Such devices, while providing some containment for the animal, are inconvenient to use and do not employ any arrangements for other components, such as ramps, stairways or storage drawers.

It has been known that pets find it uncomfortable to lie, sleep or sit in the bay of a vehicle with planer floors and perpendicular sidewalls. To address this problem, it has been proposed to provide peripheral cushions around the edge of the bay or the like to cushion the pet. Devices of this type are shown in U.S. Patent Publication No. 2008/0173627 to Martin, published Jul. 24, 2008. Such devices, while affording some comfort, fail to provide comfort within the confines of a cage or provide contoured shape complementing the shape of a pet's body when resting.

SUMMARY OF THE INVENTION

The present invention includes a horizontal frame to occupy a portion of the width of the bay of an SUV or the like, leaving the remainder of the bay available functions other than transporting a pet. The frame includes one or more rearwardly opening tunnels, one of which might house a rearwardly slidable, and telescopical ramp or stairway for deploying to introduce the pet to a cage mounted on the horizontal frame. In some aspects, the invention includes removable fences lining the inboard side of the frame and/or the forward end of the frame to restrain the pet from roaming about the interior of the bay or accessing the seats forward in the vehicle.

The features and advantages of the invention will be more readily understood from the following detailed description which should be read in conjunction with the accompanying drawings.

DETAILED DESCRIPTION OF THE PREFERRED EMBODIMENTS

Figure 3:
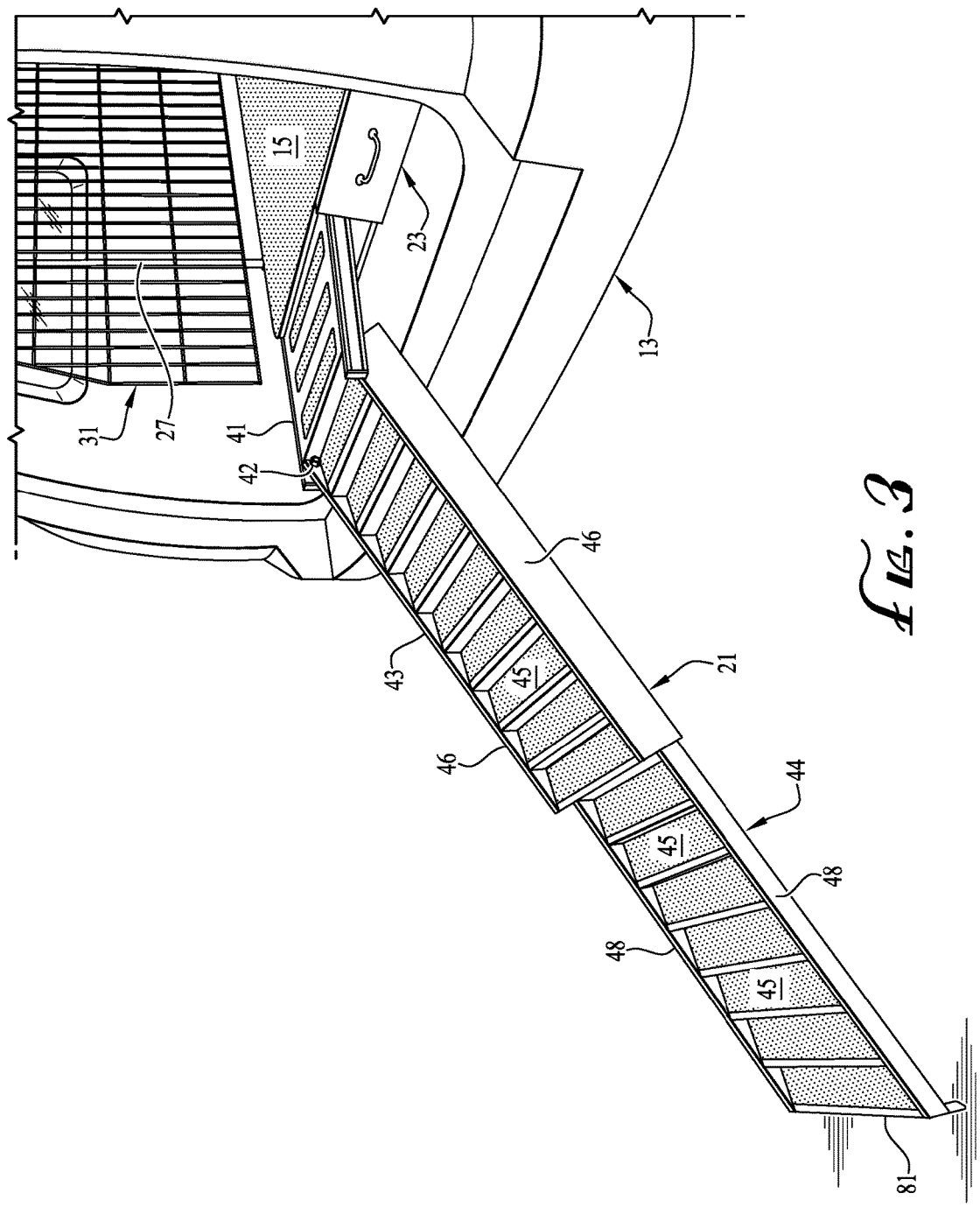
FIG. 3 is a rear perspective view of the vehicle shown in FIG. 1, in reduced scale, with the stairway deployed.

Referring now in more detail to the exemplary drawings for purposes of illustrating embodiments of the invention, wherein like reference numerals designate corresponding or like elements among the several views, In one aspect, the present invention is intended for use in the bay of a vehicle, such as a crossover or SUV 13. My device includes a bottom horizontal frame, including bottom and top walls 14 and 15, respectively, spaced apart to form therebetween rearwardly opening first and second tunnels 17 and 19 for, and in this embodiment, receipt of respective rearwardly slidable ramp or stairway device 21 and drawer 23. For the purpose of illustration, I show my stairway device 21 as being telescopically extendable from the tunnel and including a rearwardly slidable, cantilevered, top landing device 41, to which a top stairway section 43 is pivotally connected by transverse bolts 42. An extendable lower stairway section 44 is telescopically carried by the section 43. Preferably, the stairway sections 43 and 44 include steps spaced therealong and formed with respective surfaces 45 disposed in horizontal planes when the stairway device is deployed as shown in FIG. 3. Preferably, the device includes an upstanding front fence 35 and side fence 37, which act to partition from the forward seats and to divide the width of the bay into approximately one-half the overall lateral span thereof.

Utility vehicles, such as crossovers and SUVs, have become highly popular with pet owners due to the convenience of use and space provided. These vehicles are typically formed with a planer floor and vertical outboard walls 20 and a rearwardly opening doorway, which might be on the order of five feet wide, thus leaving generous space for access from the rear. It is common practice for pet owners to thus place their pets in the rear bay, occupying the entire width thereof, thus depriving the owner of that space for storage of paraphernalia and items to be transported, such as groceries, shotguns, duck decoys, and other items which cannot safely be comingled with the pet.

Thus, in one aspect of the present invention, I provide my pet cage of a width which will leave at least a portion of the bay separated from the pet, as, for instance, a quarter to one-half or so of the entire width.

I construct my bottom frame with the top and bottom horizontal walls 14 and 15 spaced vertically apart a distance of, say, four or five inches to thereby provide a height for my tunnels 17 and 19 adequate to receive a robust stairway device and drawer.

In the preferred embodiment, I provide a framework, including vertical spaced apart stub posts 30 supporting the wall 15, which acts as a false bottom for the pet compartment. In some embodiments, I cover the wall 15 with a covering, which may be plastic, rubber or other durable covering.

As shown in FIG. 3, the top form and mounting slider tracks are so constructed that, when the fully retracted, the back end mounting the bolts 42 are disposed in the vertical plane of the vehicle back bumper to dispose the telescopically stairway sections clear of such bumper.

Figure 1:
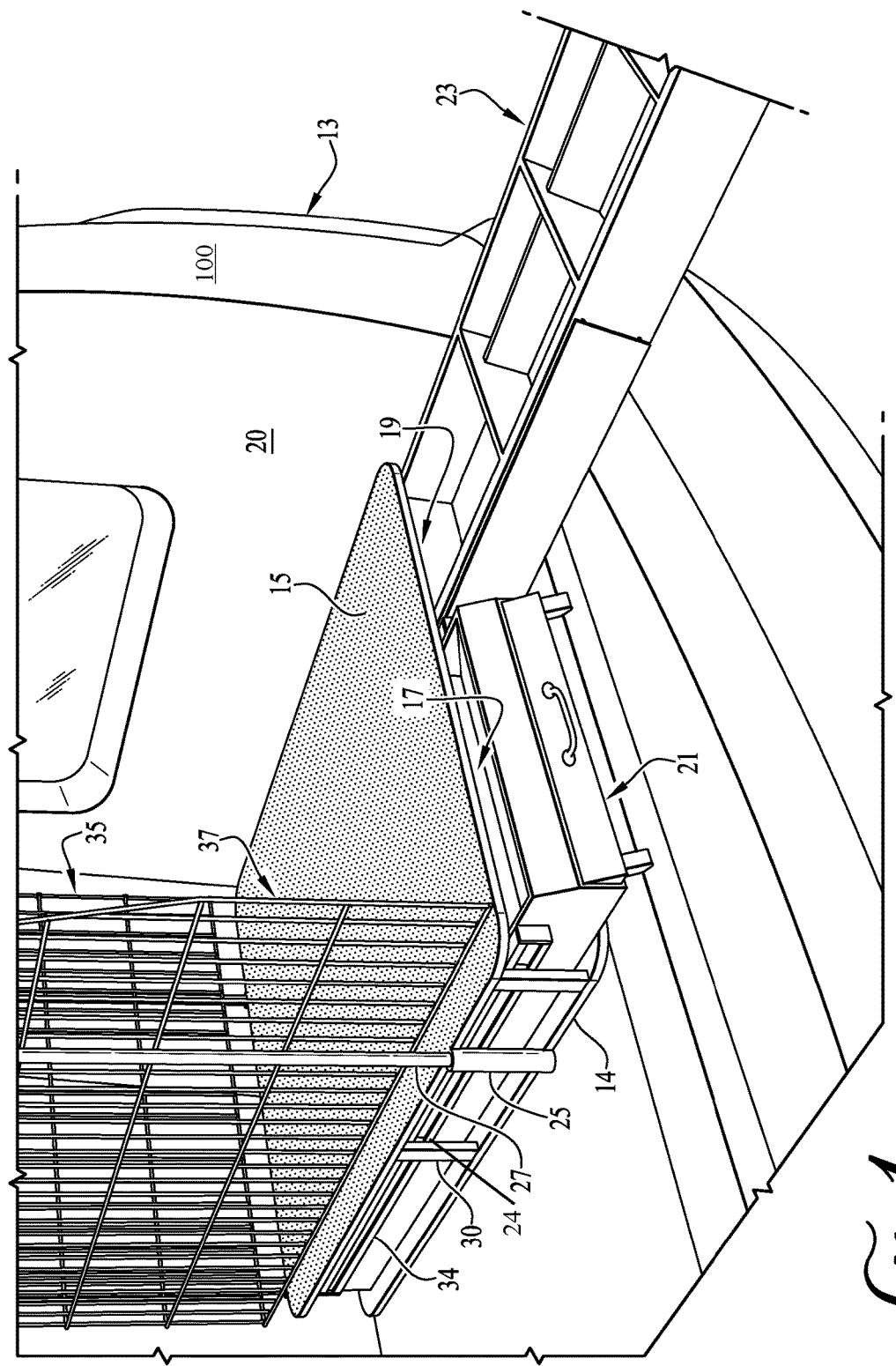
FIG. 1 is a perspective view showing the rear bay of a vehicle receiving a pet cage and stairway device of the present invention.
Figure 2:
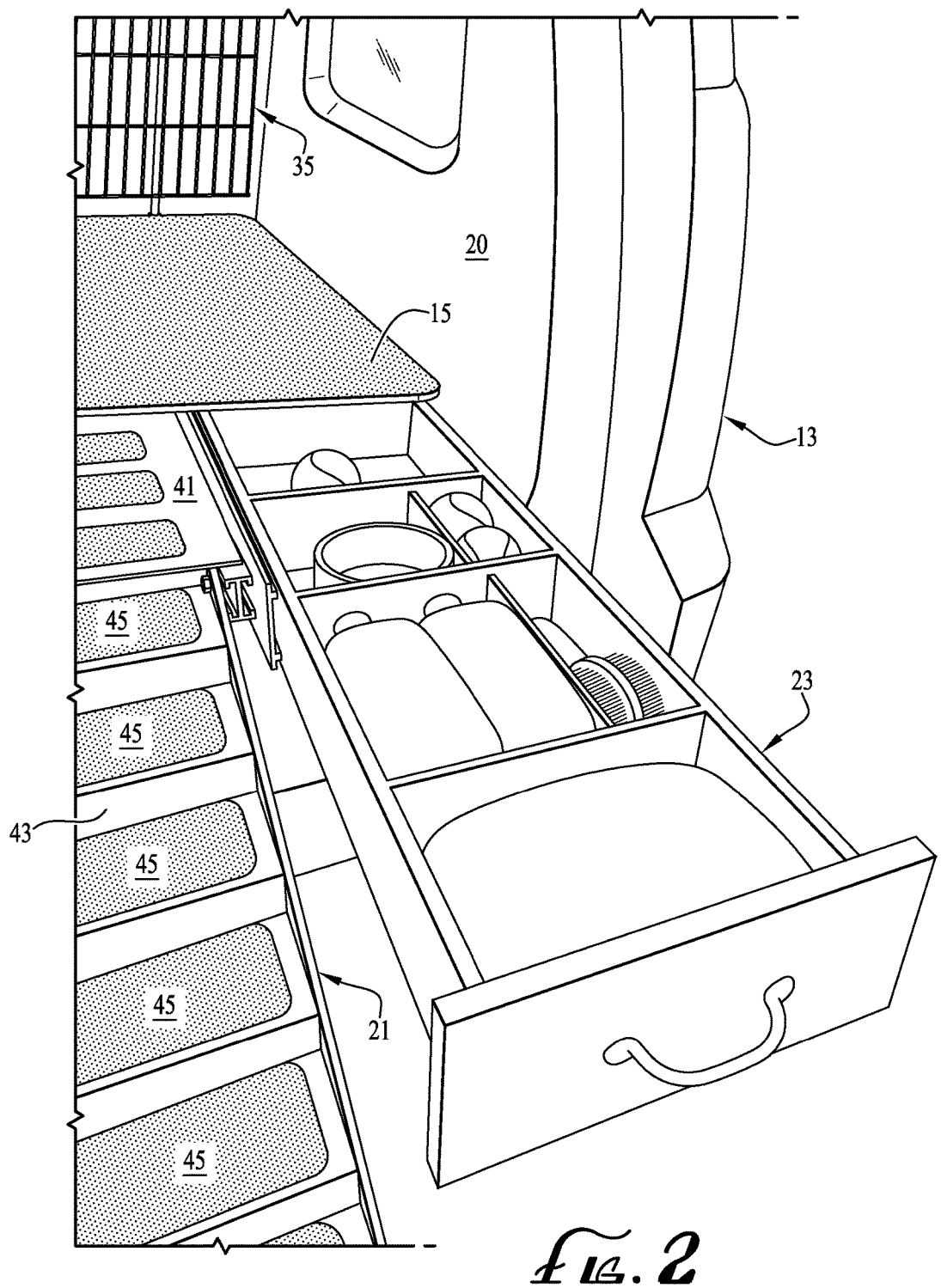
FIG. 2 is a perspective view of the right hand side of the apparatus shown in FIG. 1.

Mounted from the opposite sides of the tunnel 17 are channels defining oppositely opening horizontal tracks 34 to accommodate horizontal sliding of the landing device 41 relative to the bottom frame and sliding of the upper end of stairway section 43 relative to such landing device so the landing device may be drawn horizontally rearwardly to support the upper section in cantilever fashion. To this end wheels or sliders 24 (FIG. 1) may mounted to the opposite sides of landing device 41 to engage the respective tracks and, similarly sliders or wheels mounted to the opposite sides of the platform to engage the inner track.

Figure 4:
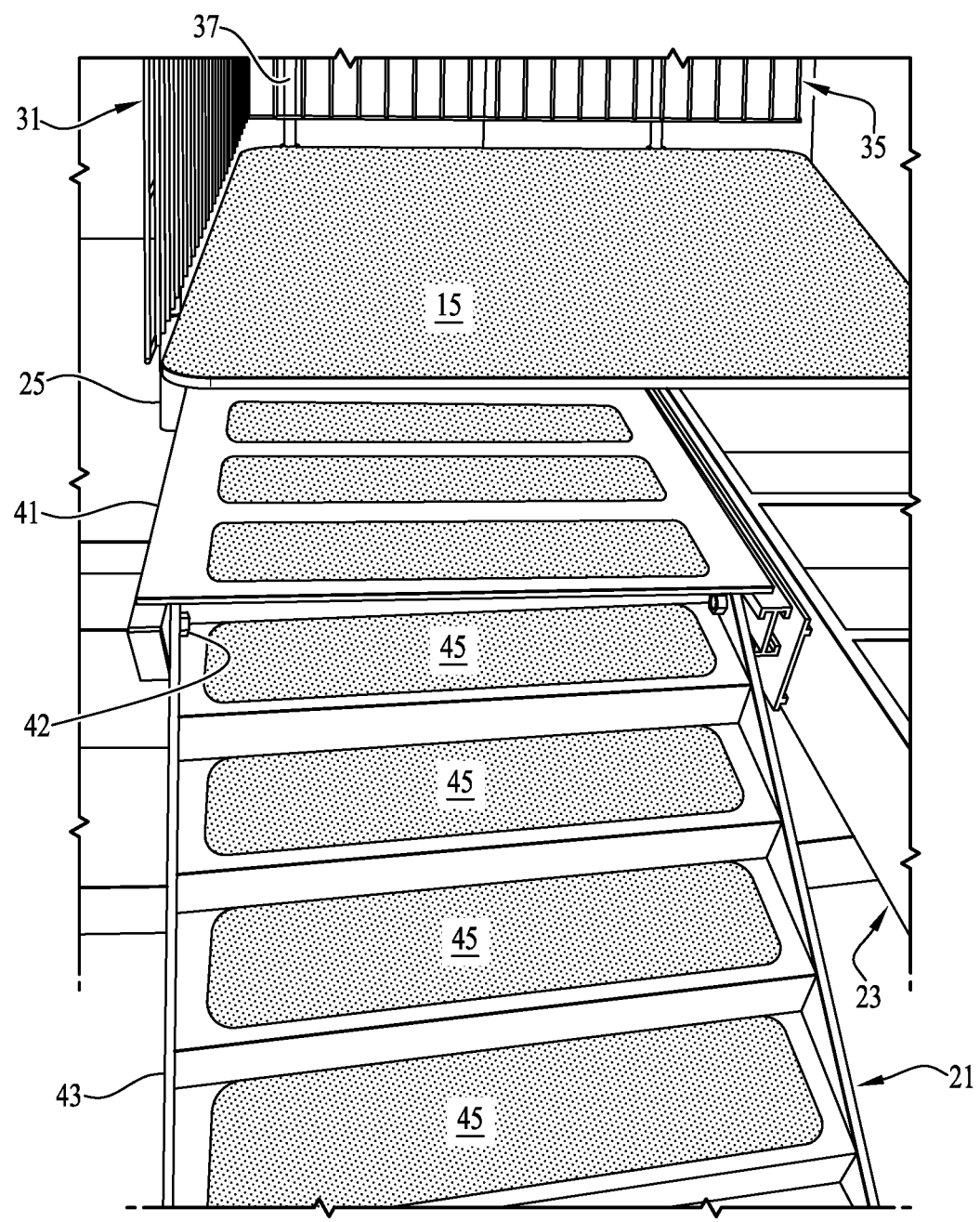
FIG. 4 is a rear perspective view of the vehicle shown in FIG. 1 with the stairway deployed.
Figure 5:
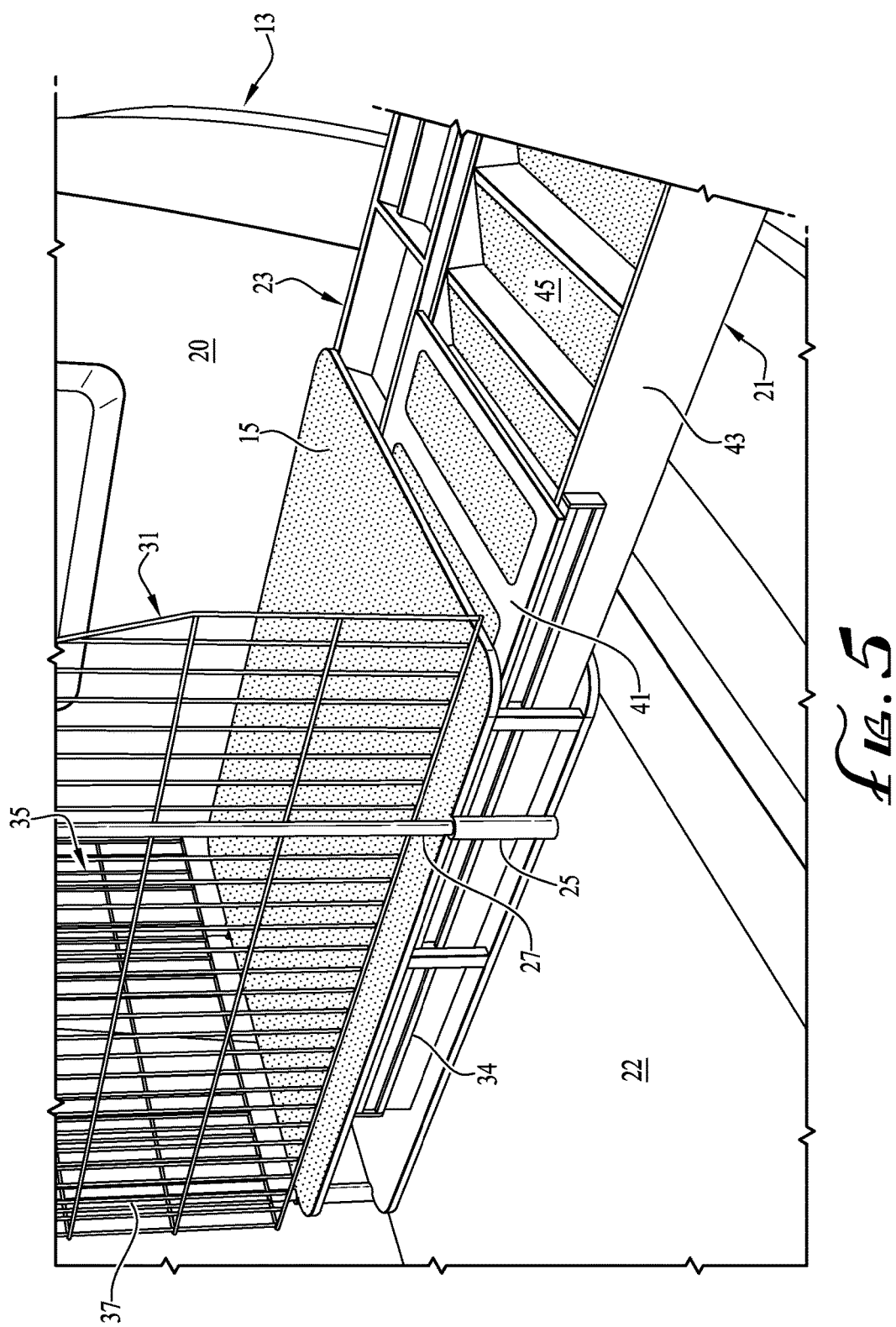
FIG. 5 is a rear perspective view of the vehicle shown in FIG. 1 depicting the stairway apparatus.
Figure 6:
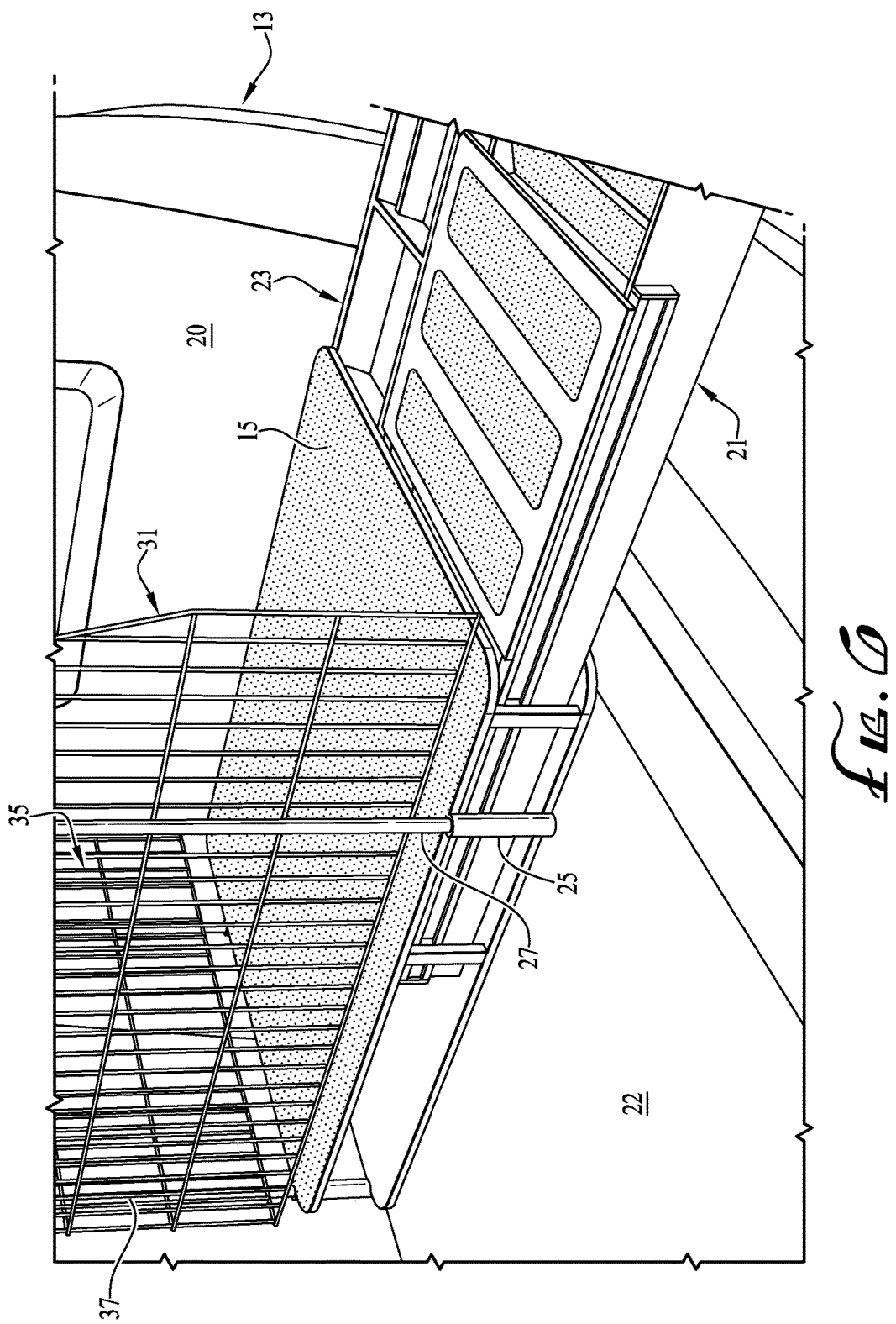
FIG. 6 is a detail view similar to FIG. 5, but showing the stairway more deployed.
Figure 7:
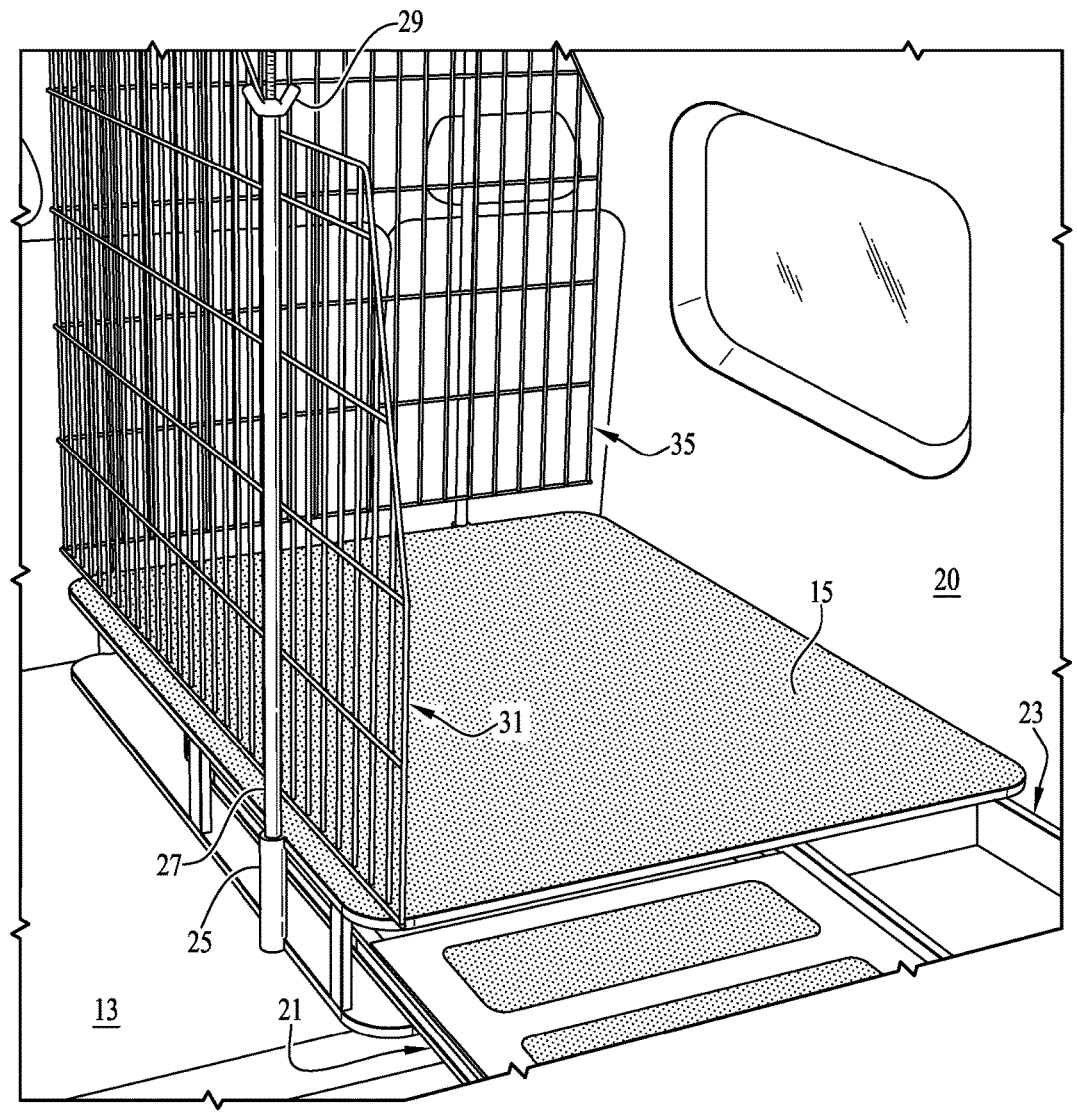
FIG. 7 is a rear perspective view of the pet cage and stairway apparatus shown in FIG. 1.
Figure 8:
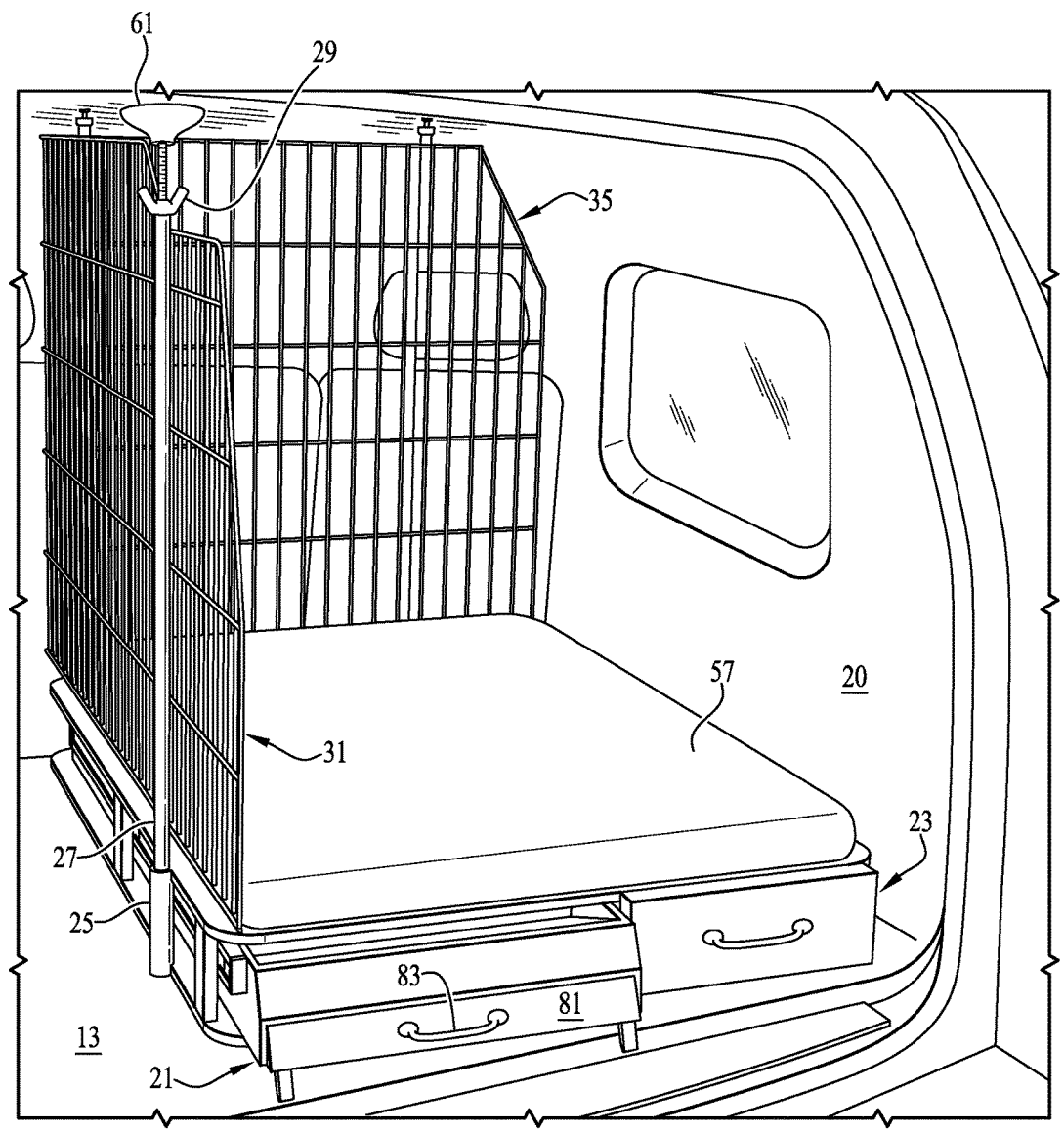
FIG. 8 is a rear perspective view similar to FIG. 7 but showing a cushion on the bottom frame of the apparatus of the present invention.

To that end the upper stairway section 43 is configured with side walls 46 which are carried on their upper extremities from the distal end of the landing device 41 by means of sliders carried on bolts 42 (FIG. 4) for pivoting and sliding relative to such tracks. Formed on the interior sides of such walls are respective inwardly opening longitudinal tracks which receive the side rails 48 of the lower section 44 to accommodate sliding longitudinally to telescope the lower section into the upper section The front and side fences 35 and 37 are preferably constructed of heavy gauge wire or thin rods to form a gridwork to be self-supporting or supported from vertical posts 27 carried in upwardly opening cylindrical receivers 25 mounted to the sides and front end of the bottom frame.

Figure 10:
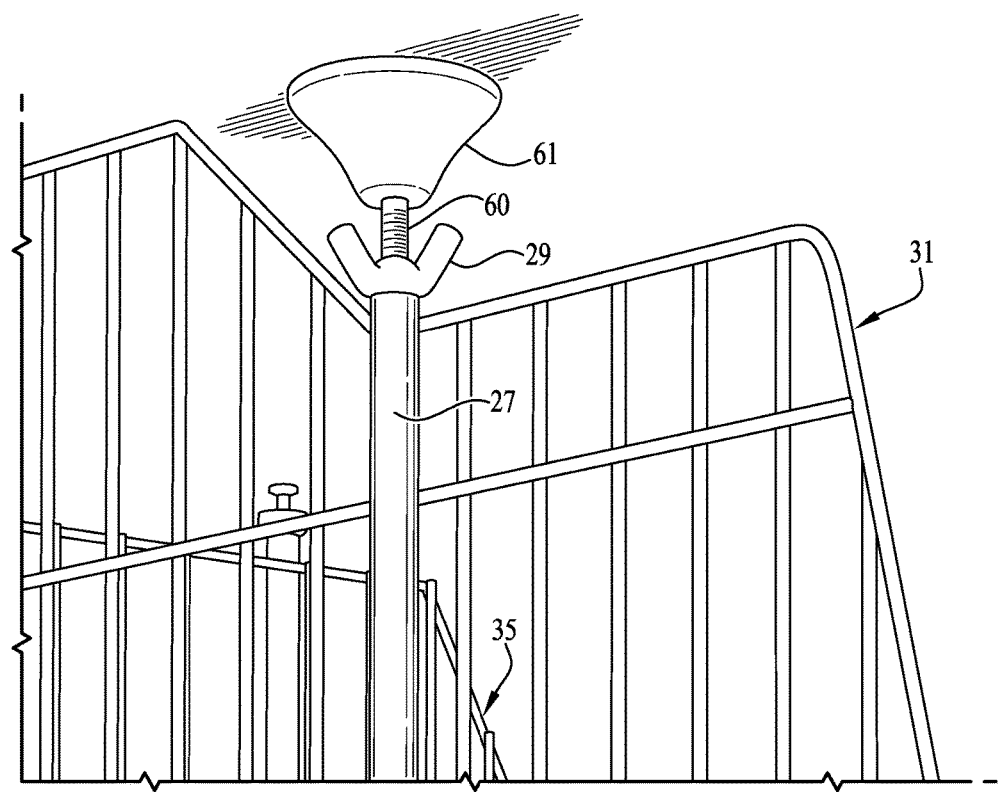
FIG. 10 is a perspective view, in enlarged scale, of a post incorporated in a fence included in the apparatus shown in FIG. 1.

In some embodiments, I incorporate a holding device for compressing against the vehicle overhead to cooperate in holding the respective fences in place. Referring to FIG. 10, for the purposes of illustration, I show a threaded rod 60 mounting a pressure plate 61 on the upper extremity thereof and driven upwardly and downwardly within the top of the open post 27 by means of a wing nut 29 so that once the fences are in place, wing nut 29 may be rotated to drive the pressure plates against the upholstery on the roof of the vehicle.

In one preferred embodiment, I incorporate a mattress 57 configured to the exact dimensions of the false bottom 15 to cover such false bottom in its entirety. In this embodiment, I incorporate an impervious cover for covering the cushioning mattress for the pet's comfort and to receive hair, grease and debris from the pet and which can be easily removed and washed by a hose or the like.

In some embodiments, I incorporate contoured cushions 51 and 53 (FIG. 9) along the respective fences 31 and 35 to fit the contour of a dog lying on the mattress covering such cushions. The cushions are formed with perpendicular bottom and back sides, as well as a marginal top surface 50, and then curves downwardly and inwardly to form a concave inwardly opening nest 52.

It will be appreciated that the drawer 23 may come in numerous different configurations and incorporate various compartments for different paraphernalia. For the purpose of illustration, I show the drawer as being customized for pet toys, water, grooming tools, cushions and the like to facilitate the organization and storage thereof and provide for ready access when needed.

In operation, it will be appreciated by those skilled in the art that the device of the present invention is economical to manufacture and convenient to use. The device may be made in several different components, sold separately and acquired by the pet owner as the pet matures or habits of the pet differ over time.

Typically, the bottom frame is fabricated and sold with the tunnels 17 and 19, with or without the stairway 21 and/or drawer 23.

In any event, the apparatus itself is self-contained and can easily be installed with a minimum of skill and effort by merely loading the frame into the back of the vehicle 13 having a doorway 100 and erecting the front and side fences 35 and 31. The fences are erected by positioning them vertically on the respective front and the inboard side of the bottom frame, with the lower ends of the respective posts 27 nested against the bottom walls of the upwardly opening receivers 25 to provide vertical support. In some embodiments, which include the pressure pad 61, the adjustable wing nuts 29 may be rotated to push the pressure pads upwardly into contact with the lining of the roof to trap the posts between the bottom walls of the receivers 25 and the lining for additional security and support, something that may be preferable for larger dogs which might bump against the respective fences when the vehicle either slows or turns a right hand corner.

Figure 9:
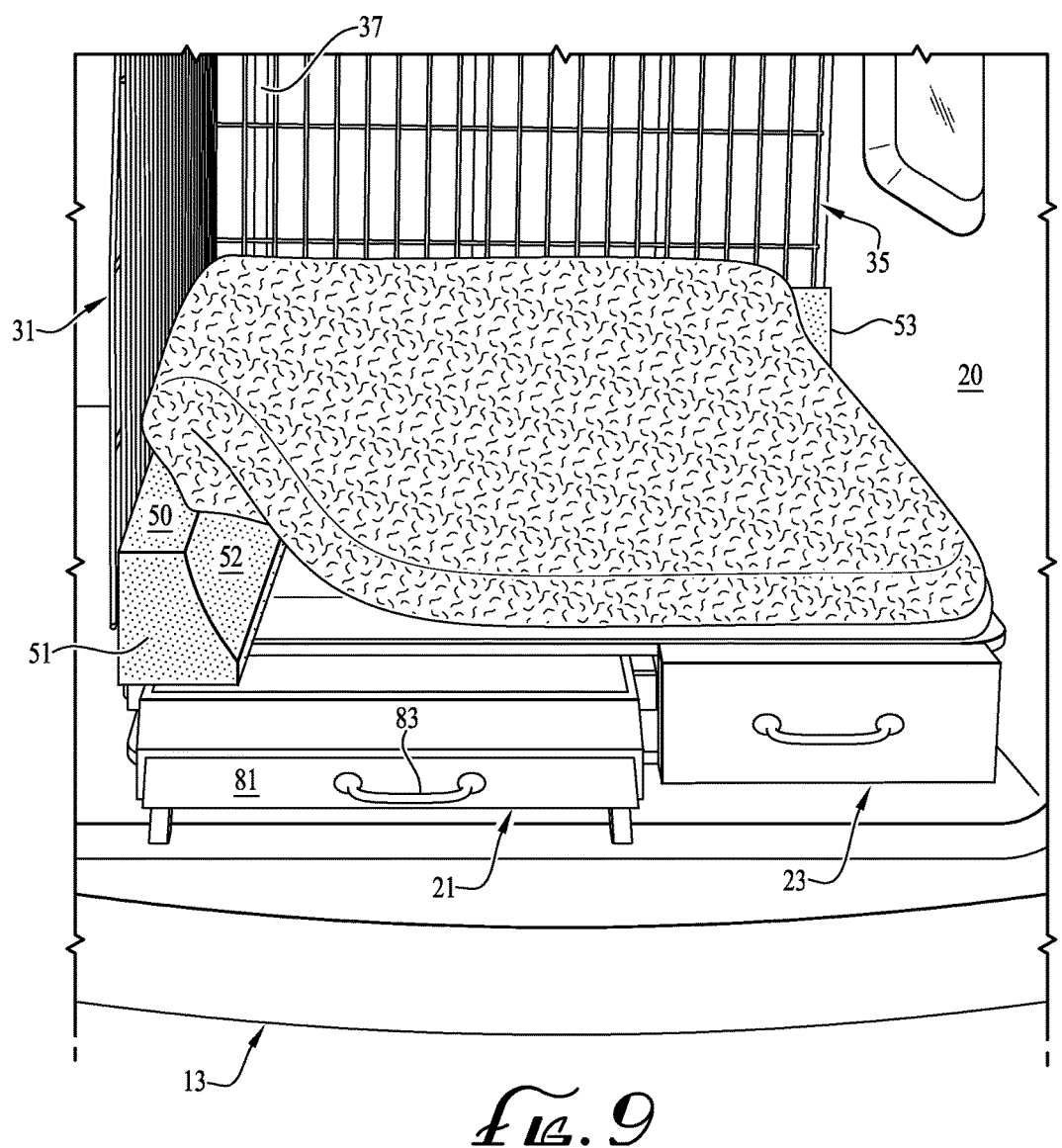
FIG. 9 is a rear perspective view similar to FIG. 8 but showing contour cushions about the periphery of the bottom frame.

In those embodiments which include a stairway device 21, the upper platform 41 will be slid back into the tunnel and the middle stairway section 43 and lower section 48 raised to slide the slider supporting the pivot 42 rearwardly in the track 21 and forwardly into the tracks on the inside of the respective side walls 46 of the upper stairway section 43 to thus telescope the upper section 43 relative to the platform 41 and the lower section 44 into the upper section 43, thus creating a relatively neat and attractive closure as depicted in FIG. 9. In some embodiments, the free end 81 of the lower stairway section 44 includes a face plate mounting a handle 83 for convenience of shifting. The lower stairway section 44 may also mount on its lower extremity a brace or foot 66 (FIG. 3) which may be pivoted downwardly when deployed to serve as a support for the lower end of such section 44 to maintain the bottom end elevated from the supporting surface.

Likewise, either upon initial purchase or as an add-on later, a drawer 23 may be acquired to fit within the associated tunnel to provide for convenient storage and easy access.

It will be appreciated that the owner may elect to purchase the contoured cushions 51 and 53 to be disposed in close fit relationship along the respective side and front of the cage defined by the fences 31 and 35, respectively. The mattress 57 may then be positioned on the upper wall 15 and folded upwardly onto the respective contoured cushions 51 and 53 as shown in FIG. 9.

When the owner elects to take the pet on an outing, he or she may open the back door of the vehicle 13 for access to the interior of the cage. For a younger and nimble pet, the pet may readily spring upwardly into the interior of the cage without the assistance of a stairway or ladder. Then, by closing the rear door, the pet will be confined to the interior of the cage and will be blocked from leaping forwardly over into the passenger seats or intruding on the inboard side of the cage, thus leaving the storage space 20 open and accessible for storage of groceries and the like during transport.

For older or larger dogs, the owner will want to have the benefit of the stairway and can easily deploy the stairway for loading and unloading of the pet. This may be achieved by, when the rear door of the vehicle is open as in FIG. 9, grasping the handle 83 at the free end 81 and easily and effortlessly drawing the landing device 41 rearwardly and drawing the upper and lower stairway sections rearwardly to telescope them apart to the deployed position shown in FIG. 3. In my preferred embodiment, the components are so balanced that this deployment may be by one finger. The foot 66 (FIG. 3) at the bottom of the section 44 will provide support from the ground and, in some instances, is formed to elevate the bottom of the stairway to maintain it raised from underlying debris or mud or the like.

With the stairway 21 so deployed, the animal will have ready access to the steps 45 to walk up the stairway sections 44 and 46 at a favorable angle with his or her paws on the horizontal surfaces 45, thus giving a sense of security and stability as the pet progresses up the sections 44 and 43 to the platform 41 to enter the cage area to rest on the upper wall 15 or cushion, as the case may be.

With the pet loaded in the cage, the stairway 21 may be easily raised and the sections 44 and 43 telescoped together and into the landing device 41, driving it forwardly into its stored position for convenient and compact storage during the ride.

From the foregoing, it will be appreciated that the apparatus of the present invention, in its various aspects, provides a convenient, inexpensive and effective means for containing a dog or other pet in a regulated area of a rear bay of a van or the like. The device is convenient to install and provides an organized arrangement for loading, unloading and transport of the dog. The stairway is stored in an organized and convenient fashion with minimal effort without the necessity of wrestling a ramp or ladder around and accessing the backseat for storage during travel, or hooking over the rear of the vehicle for loading and risking the attendant instability during loading or unloading of the pet.

The invention may be embodied in other forms without departure from the spirit and essential characteristics thereof. The embodiments described therefore are to be considered in all respects as illustrative and not restrictive. Although the present invention has been described in terms of certain preferred embodiments, other embodiments that are apparent to those of ordinary skill in the art are also within the scope of the invention. Accordingly, the scope of the invention is intended to be defined only by reference to the appended claims.

I claim:

1. Pet cage and stairway apparatus to be carried in a back bay of a vehicle having a floor, ceiling, side walls, and doorway of a predetermined width and comprising:
    a horizontal bottom frame having a lateral width less than the predetermined width, formed with back and front ends and inboard and outboard sides and vertically spaced apart top and bottom walls;
    upstanding side and front fences carried on the respective inboard side and the front end of the bottom frame;
    the bottom frame configured with at least one tunnel opening outwardly toward the doorway;
    a portable ladder device received in the at least one tunnel and slidable outwardly to project outwardly and downwardly to an inclined portion;
    a landing device interposed between the ladder device and bottom frame to slide outwardly relative to the bottom frame and to accommodate sliding of the ladder outwardly in the at least one tunnel to the inclined portion;
    a pivot device connecting the ladder device to the landing device to provide for pivoting of the ladder device downwardly and outwardly to the inclined position.

2. The apparatus of claim 1 wherein:
    the horizontal bottom frame is constructed with the lateral width no greater than one half the predetermined width.

3. The apparatus of claim 1 wherein:
the ladder device includes stair steps having, when the ladder device is in the inclined position, horizontal step surfaces.

4. The apparatus of claim 1 wherein:
the bottom frame includes a pair of first and second outwardly opening tunnels; and
the ladder device is received in the first tunnel and the apparatus includes a drawer received slidably in the second tunnel.

5. The apparatus of claim 1 wherein:
the ladder device includes a plurality of stairway sections connected together by sliders for sliding to extended positions when the ladder device is drawn outwardly from the tunnel.

6. The apparatus of claim 1 wherein:
the side fence includes at least one vertical post supported from the inboard side of the bottom frame.

7. The apparatus of claim 6 wherein:
the post includes a vertically extendable screw device; and
a pressure pad carried on top of the screw device for selective engagement with the ceiling of the bay.

8. The apparatus of claim 1 wherein:
the front fence includes at least one vertical post supported on its bottom end from the front end of the horizontal bottom frame.

9. The apparatus of claim 1 wherein:
the ladder device includes a foot to engage an underlying support surface.

10. The apparatus of claim 1 that includes:
a cushion supported on the top wall and sized to complementarily fit between the outboard side and the side fence.

11. The apparatus of claim 1 that includes:
an elongated contoured cushion supported on the top wall and nested against the side fence.

12. The apparatus of claim 1 that includes:
a contoured cushion supported on the top wall and nested against the front fence.

13. The apparatus of claim 1 wherein:
the ladder device includes a first ladder section including side walls and steps arrayed longitudinally there along;
a second ladder section slidable along the side walls in flanking relationship with the steps; and
a slider device inturned between the side walls and second ladder section.

14. A pet cage and ladder apparatus to be carried in a back bay of a vehicle having a doorway of a predetermined width and comprising:
a horizontal bottom frame having front and inboard sides and including a floor wall for resting on the bottom of the bay, a horizontal top wall spaced there above, and vertical posts connecting a bottom and top walls together;
the frame formed with rearwardly opening first and second tunnels;
a landing device received slidably in the rearwardly opening first tunnel and slidable to an extended horizontal landing position;
a ladder device received slidably in the landing device and including first and second sections slidably connected together for extension to be slidably collapsed with one another to a collapsed position and extendable to be lowered to a support surface;
a foot mounted on the second section to engage the support surface;
a drawer slidably received in the rearwardly opening second tunnel and including compartments for storage of paraphernalia;
a side fence mounted to the inboard side of the bottom frame and including at least one post braced against the roof of the bay; and
a front fence mounted on the front side of the bottom frame and including at least one post braced against a roof of the bay.

* * * * *